United States Patent
Barrett et al.

(10) Patent No.: US 9,207,093 B2
(45) Date of Patent: Dec. 8, 2015

(54) NAVIGATION BASED ON CALENDAR EVENTS

(71) Applicant: CLOUDCAR, INC., Los Altos, CA (US)

(72) Inventors: Peter Barrett, Palo Alto, CA (US); Bruce Leak, Los Altos Hills, CA (US); Konstantin Othmer, Los Altos, CA (US); Zarko Draganic, Belvedere, CA (US)

(73) Assignee: CLOUDCAR, INC., Mountain View, CA (US)

( * ) Notice: Subject to any disclaimer, the term of this patent is extended or adjusted under 35 U.S.C. 154(b) by 60 days.

(21) Appl. No.: 13/735,893

(22) Filed: Jan. 7, 2013

(65) Prior Publication Data

US 2014/0195469 A1 Jul. 10, 2014

(51) Int. Cl.
*G06N 5/04* (2006.01)
*G01C 21/36* (2006.01)
*G06N 5/02* (2006.01)

(52) U.S. Cl.
CPC .......... *G01C 21/362* (2013.01); *G06N 5/02* (2013.01); *G06N 5/022* (2013.01); *G06N 5/04* (2013.01)

(58) Field of Classification Search
None
See application file for complete search history.

(56) References Cited

U.S. PATENT DOCUMENTS

| 7,941,753 | B2 | 5/2011 | Meisels et al. |
|---|---|---|---|
| 2012/0029964 | A1 | 2/2012 | Tengler et al. |
| 2012/0197523 | A1 | 8/2012 | Kirsch |
| 2012/0254763 | A1 | 10/2012 | Protopapas et al. |
| 2013/0151149 | A1 | 6/2013 | Kristinsson et al. |
| 2014/0118222 | A1 | 5/2014 | Barrett |
| 2014/0121891 | A1 | 5/2014 | Barrett |

OTHER PUBLICATIONS

Department for Transport, Telematics for Efficient Road Freight Operations, Freight Best Practice, United Kingdom, 2007, pp. 1-48.*
International Search Report dated May 15, 2014 as received in Application No. PCT/US2014/010542.
Written Opinion on International Searching Authority dated May 15, 2014 as received in Application No. PCT/US2014/010542.

* cited by examiner

*Primary Examiner* — Wilbert L Starks
(74) *Attorney, Agent, or Firm* — Maschoff Brennan

(57) ABSTRACT

An example embodiment disclosed herein includes a predictive vehicle navigation system. The predictive vehicle navigation system includes an abstraction and communication device (hereinafter "device") and a mobile device. The device includes an adaptor configured to interface with a Controller Area Network (CAN) bus of a vehicle and to abstract vehicle data from the vehicle. The mobile device includes an operation determination module configured to determine that an operator is operating the vehicle based on a subset of the data, a clock configured to track actual time, and a navigation module configured to receive the actual time and the determination that the operator is operating the vehicle, to access a calendar event that includes an address and a scheduled time, and when the actual time is within a predetermined threshold of the scheduled time, to predict that the address is a destination of the operator.

20 Claims, 5 Drawing Sheets

NAVIGATION BASED ON CALENDAR EVENTS

BACKGROUND

1. Field

The embodiments discussed herein relate to vehicle navigation. More particularly, some example embodiments relate to utilization of a calendar application in vehicle navigation.

2. Relevant Technology

Commercial calendar applications are widely used to track, store, and schedule events. Some examples of calendar applications include Apple Calendar (formerly iCal), Microsoft Outlook, Yahoo Calendar, and Google Calendar. In these and other calendar applications, events are input as calendar events, which tie events to scheduled times. Additionally, calendar events typically include relevant information pertaining to the events. For example, the address of the event, the scheduled time of the event, other attendees of the event, their contact information, etc. may be included in calendar events. The user of the calendar application, or another authorized user such as an assistant, usually inputs each of these pieces of information or this information is included in an invitation communicated to the user and input into a calendar event.

Additionally, calendar applications have an option to repeat or copy one calendar event multiple times. The repeat function may be useful in a periodic event, such as a weekly meeting or monthly appointment. Some commercial calendar applications also interface with a user's email account. For instance, Outlook incorporates email software with calendar functionality. For example, as an event nears, a reminder may be sent to the user to remind the user of the event. Aside from email, however, calendar applications have limited interaction with other systems or applications.

Navigation applications provide a set or series of instructions to direct a user to a destination. Typically, navigation applications rely on global positioning system (hereinafter "GPS") or another external signal to find a user's location and then direct the user to a destination in real time. Commercial navigation applications are often incorporated into vehicles or installed on mobile devices. Modern automobiles, for instance, often include navigation applications having real time, updatable maps with audio instructions. The maps are displayed on a head unit installed in the dashboard of the automobile such that the user can see and interact with the application.

However, a user has to input the destination manually. This can be a cumbersome process often including selecting a state, then a city, then scrolling through a myriad of points of interest or cross-streets. This is particularly cumbersome and unsafe when the user is operating a vehicle. In some circumstances, the user may be forced to pull over to input a destination into the navigation application to avoid causing an unsafe condition and/or to comply with local or state laws.

The subject matter claimed herein is not limited to embodiments that solve any disadvantages or that operate only in environments such as those described above. Rather, this background is only provided to illustrate one example technology area where some embodiments described herein may be practiced.

SUMMARY

This Summary introduces a selection of concepts in a simplified form that are further described below. This Summary is not intended to identify key features or essential characteristics of the claimed subject matter, nor is it intended to be used as an aid in determining the scope of the claimed subject matter.

An example embodiment disclosed herein includes a predictive vehicle navigation system. In general, the predictive vehicle navigation system uses vehicle data and information in a calendar application of an operator to predict a destination of the operator. More particularly, from the vehicle data and the information, the predictive vehicle navigation system determines when the operator is likely traveling to an event scheduled in the calendar application. When this determination is made, the predictive vehicle navigation system predicts that an address of the event is the destination of the operator. The address is confirmed as the destination of the operator and then communicated to a navigation application.

In some embodiments, the predictive vehicle navigation system includes an abstraction and communication device (hereinafter "device") and a mobile device such as a smartphone. The device abstracts relevant vehicle data from the vehicle used to determine whether the operator is operating the vehicle. The device includes an adaptor, which is configured to interface with a Controller Area Network (CAN) bus of the vehicle. Through interfacing with the CAN bus, the device can abstract the vehicle data pertaining to operational states of vehicle components and process these data. The device communicates the vehicle data to the mobile device.

The mobile device includes an operation determination module, a clock, and a navigation module. The operation determination module receives the vehicle data from the device and determines whether the operator is operating the vehicle. The determination is communicated to a navigation module. The clock tracks actual time (date and time of day), which is communicated to the navigation module.

The navigation module receives the actual time and the determination that the operator is operating the vehicle. Additionally, the navigation module accesses event information from the calendar application. For example, the navigation module can access event information from a local calendar application loaded on the mobile device or access event information located on a remote calendar application via a communication network. An example of the remote calendar application is Google Calendar or similar calendar applications which store calendar event data on a cloud network that is accessible via a wireless communication network. Based on the actual time and the determination that the operator is operating the vehicle, the navigation module predicts that an address of an event, which is scheduled in the calendar application, is the destination of the operator. The navigation module extracts the address from the calendar application and communicates to the operator that it predicts that the address is the destination of the operator. When the operator confirms the prediction, the device inputs the address as the destination in a navigation application. The predictive vehicle navigation system thus reduces the cumbersome process of manually inputting the address into the navigation application.

In some embodiments, the navigation module is configured to receive the actual time and the determination that the operator is operating the vehicle and to access the scheduled times of events scheduled in the calendar events. The navigation module compares the actual time to the scheduled times of the events. When the actual time is within a predetermined threshold of a scheduled time of an event and the operator is operating the vehicle, the navigation module predicts that the address of the event is a destination of the operator. For example, if the operator is operating the vehicle 10 minutes before the scheduled starting time of a meeting, then the navigation module predicts that the operator is driving to the meeting.

The navigation module then communicates to the operator that the address is the predicted destination. If the operator confirms that the address is the destination, then the device inputs the address to a navigation application as the destination. The predictive vehicle navigation system saves the operator having to manually input the destination to the navigation application. Additionally, the predictive vehicle navigation system saves a considerable number of steps in the interactions with the navigation application. Further, this automatic system avoids the operator having to pull over or even to shift the operator's attention from driving.

Additionally, the navigation module can access other data in the calendar events for a variety of purposes. For example, the navigation module can monitor the progress of the operator along the route to a particular destination. If it appears that the operator is going to arrive at the address after the scheduled time, then the navigation module can access contact information of other attendees of the event. A notification may be sent to the other attendees as an email message or a text message letting them know the operator is going to be late.

Additionally, the navigation module can recognize when the calendar event is one of a repeating calendar event. For example, the navigation module can recognize that the operator has scheduled an event occurring at a consistent address at a recognizable interval. When the operator is operating the vehicle on one of the recognizable intervals, the navigation module predicts that the consistent address is the destination. The navigation module then confirms with the operator that the consistent address is indeed the destination and inputs the consistent address to a navigation application.

Another embodiment includes a method of predictive vehicle navigation. The method includes obtaining permission from an operator to access a calendar application including a calendar event of the operator. The method also includes accessing an address and a scheduled time associated with the calendar event. Based on the scheduled time and a determination that the operator is operating a vehicle, the method includes predictively determining that the address is a destination of the operator.

Another embodiment includes a method of vehicle navigation. The method includes accessing a scheduled time and an address associated with a calendar event. When an actual time is within a predetermined threshold of the scheduled time and an operator of a vehicle is operating the vehicle, the address from the calendar event is extracted and the address is predicted as a destination of the operator. It is confirmed with the operator that the address is the destination. When confirmed, the address is input as the destination in a navigation application.

Additional features and advantages will be set forth in the description which follows, and in part will be obvious from the description, or may be learned by the practice of the embodiments. The features and advantages of the embodiments will be realized and obtained by means of the instruments and combinations particularly pointed out in the claims. These and other features will become more fully apparent from the following description and claims, or may be learned by the practice of the embodiments as set forth hereinafter.

BRIEF DESCRIPTION OF THE DRAWINGS

Embodiments will be described and explained with additional specificity and detail through the use of the accompanying drawings in which.

DESCRIPTION OF SOME EXAMPLE EMBODIMENTS

Some example embodiments discussed herein relate to utilization of a calendar application in vehicle navigation. Particularly, some embodiments reduce the necessity of manually inputting destinations into a navigation application. To schedule an event in a calendar application, a calendar event is created by an operator, an assistant, or the like, often on a desktop or laptop computer, tablet, or smartphone outside of the user's vehicle. The calendar event usually includes a scheduled time of the event and an address of the event. The calendar event and vehicle data are accessed to determine whether the operator is traveling to the event scheduled in the calendar event. For instance, criteria such as whether the vehicle is operating, the scheduled time of the event, the actual time, previous behavior of the operator, etc. are used to determine whether the operator is traveling to an event. When it is determined that the operator is traveling to the event, a prediction is made that the address of the event is the destination of the operator. This prediction is confirmed, and then the address is input into a navigation application. The calendar application can be stored on a mobile device of the operator or stored remotely and accessed via a communication network. The calendar application may be stored remotely in a cloud network, for instance. Permission is granted by the operator that allows access to the calendar application stored on the mobile device or accessed via the communication network.

Reference will now be made to the figures wherein like structures will be provided with like reference designations. The drawings are diagrammatic and schematic representations of example embodiments and, accordingly, are not limiting of the scope of the claimed subject matter, nor are the drawings necessarily drawn to scale.

Figure 1:
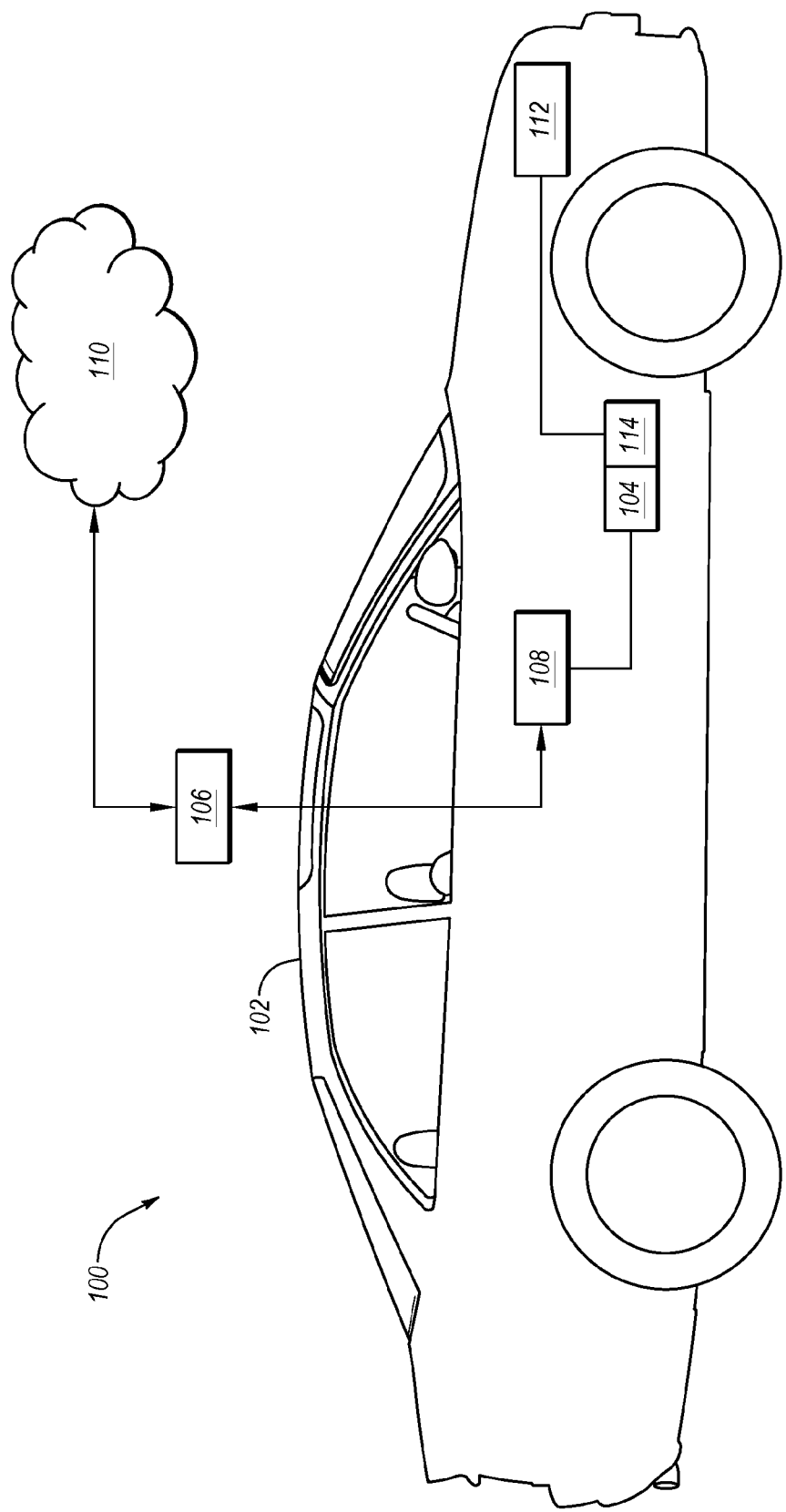
FIG. 1 illustrates an example operating environment in which some embodiments described herein may be implemented.

FIG. 1 illustrates an example operating environment 100 in which some embodiments described herein may be implemented. The operating environment 100 includes a vehicle 102 into which an abstraction and communication device (hereinafter "device") 108 has been installed. Although illustrated as an automobile, this depiction is not meant to be limiting to the vehicle 102. Specifically, the vehicle 102 may include, but is not limited to, a car, a truck a motorcycle, a tractor, an airplane, a boat, etc.

The device 108 is configured to communicate with a mobile device 106 and one or more vehicle components 112. To communicate with the vehicle components 112, the device 108 includes an adaptor 104 configured to interface with one or more Controller Area Network (hereinafter "CAN") buses 114. The CAN bus 114 connects to the vehicle components 112 such that operational states of the vehicle components 112 can be received, monitored, and/or modified. The CAN bus 114 can alternatively or additionally include any bus used in a vehicle 102 for communicating signals between components, including other standards like media oriented systems transport (MOST), local interconnect network (LIN), Inter-Integrated Circuit (I2C), and Ethernet. In operation, the device 108 relays vehicle data between the vehicle 102 and the mobile device 106.

For example, the vehicle components 112 can include a global positioning system (hereinafter "GPS") receiver and/or a speed sensor. Accordingly, the related operational states can be a position and a time sensed by the GPS receiver and/or a speed of the vehicle 102 sensed by the speed sensor. As the vehicle 102 operates, the position, the time, and the speed are communicated to the CAN bus 114. The device 108 abstracts the position, the time, and the speed using the adaptor 104 and communicates the position, the time, and the speed to the mobile device 106, to another device which is accessed directly via the communication network 110, or to another device accessed by tethering to the communication network 110 through the mobile device 106. The mobile device 106 and/or one or more other devices, can have a mobile navigation application configured to receive and/or use the position, the time, and the speed. When the operator accesses the device 108 via the mobile device 106 and/or the communication network 110, the operational state of the vehicle is fully determined and may be used for predictive navigation based on calendar events. Navigation data can include a real-time display and/or voice guidance of the mobile navigation application on a display and/or speakers in the vehicle 102, using the position, the time, and the speed. Navigation data may also be communicated to the device 108 to be projected to a head unit, for instance.

The vehicle 102, the device 108, the vehicle components 112, the mobile device 106, and/or communication between them can occur substantially as disclosed in U.S. patent application Ser. No. 13/664,212, entitled "AUTOMOBILE DATA ABSTRACTION AND COMMUNICATION" and filed Oct. 30, 2012, which is incorporated herein by reference in its entirety.

In some embodiments, projection of content communicated between the vehicle 102, the device 108, the vehicle components 112, and/or the mobile device 106 can occur substantially as disclosed in U.S. patent application Ser. No. 13/664,204, entitled "PROJECTION OF CONTENT TO EXTERNAL DISPLAY DEVICES" and filed Oct. 30, 2012, which is incorporated herein by reference in its entirety.

Figure 2A:
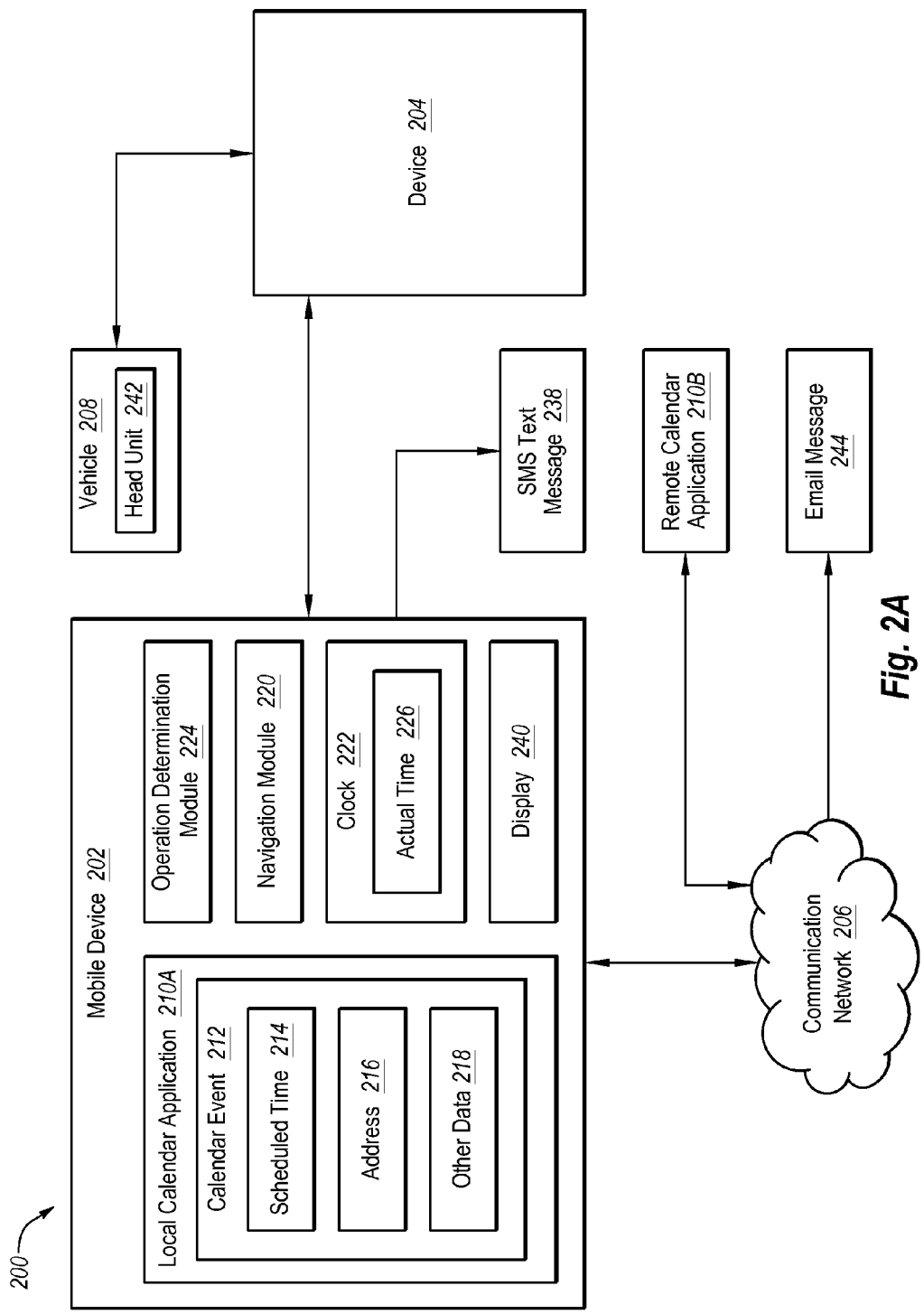
FIGS. 2A-2B illustrate an example predictive vehicle navigation system that may be implemented in the operating environment of FIG. 1.
Figure 2B:
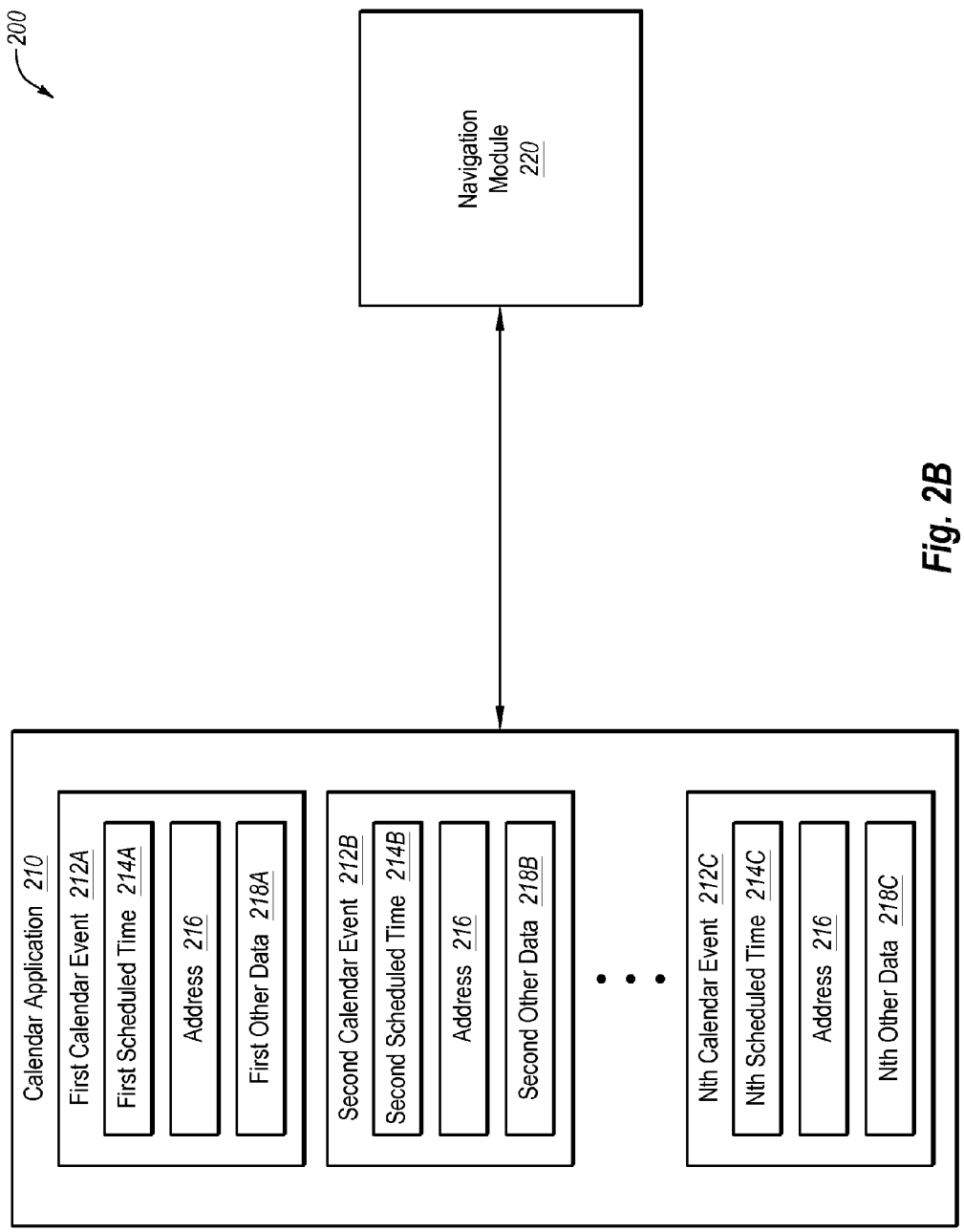

FIGS. 2A-2B illustrate an example predictive vehicle navigation system 200 that may be implemented in the operating environment 100 of FIG. 1. The predictive vehicle navigation system 200 generally interfaces with a navigation application (not shown) to display to an operator (not shown) a set of instructions that directs the operator to a destination while operating a vehicle 208. The predictive vehicle navigation system 200 is configured to predict the destination of the operator at a particular time based on a calendar application 210A or 210B of the operator. Additionally, the predictive vehicle navigation system 200 accesses and extracts information (e.g., 214, 216, and 218) associated with a particular calendar event 212 to provide additional functionality to the navigation application. By predicting the destination, the operator is not forced to manually enter information (e.g., 214, 216, and 218) relevant to a particular set of instructions, thus saving time and unnecessary steps for the operator and avoiding potentially dangerous situations such as the manual entry of such information while driving.

The predictive vehicle navigation system 200 includes a mobile device 202, an abstraction and communication device (hereinafter "device") 204, a communication network 206, and the vehicle 208 which are substantially similar to the mobile device 106, the device 108, the communication network 110, and the vehicle 102 of FIG. 1. Generally, in the predictive vehicle navigation system 200, the mobile device 202 can access a local calendar application 210A by communicating internally within the mobile device 202. Additionally, the mobile device 202 can access a remote calendar application 210B via the communication network 206. The local calendar application 210A and the remote calendar application 210B are collectively referred to herein as "calendar application 210" or "calendar applications 210". The information (e.g., 214, 216, and 218) included in the calendar application 210 may be accessed and/or extracted by the mobile device 202 to predictively determine a destination. In the context of the predictive vehicle navigation system 200, the information is accessed and extracted from the calendar application 210 to predictively determine a destination which is entered into the navigation application.

The navigation application can be loaded onto the vehicle 208 or the mobile device 202. When the navigation application is loaded onto the vehicle 208, the navigation application is configured to interface with the mobile device 202 via the device 204 such that the mobile device 202 can communicate the address 216 to the navigation application. When the navigation application is loaded onto mobile device 202, the navigation application is configured to interface with a navigation module 220 (discussed below) internally. The navigation application can include, but is not limited to, a satellite navigation system such as the GPS system, a global navigation satellite system (GLONASS), a terrestrial navigation system such as the long range navigation (LORAN) system, Wi-Fi-based positioning system (WPS) or any other suitable navigation application.

The illustrated embodiment of the mobile device 202 includes an operation determination module 224. This depiction, however, is not meant to be limiting. In some embodiments, the operation determination module 224 can be integrated onto the device 204 such that the functionality associated with the operational determination module 224 is integrated into the device 204.

The operation determination module 224 is configured to receive vehicle data from the vehicle 208 (via the device 204), the mobile device 202, and/or the communication network 206 to determine whether the operator is operating the vehicle 208. For example, the operation determination module 224 is configured to read or otherwise sense synchronization between the mobile device 202 and the device 204. The synchronization can indicate that the operator is present within the vehicle 208 or that the mobile device 202 operated by the operator is present in the cabin of the vehicle 208. Additionally or alternatively, the operation determination module 224 can be configured to receive a particular input from one or more vehicle components such as vehicle components 112 of FIG. 1 via the device 204, which can indicate that the operator is operating the vehicle 208.

The mobile device 202 also includes clock 222. The clock 222 can refer to a mechanism configured to track actual time 226, which can include the date and time of day, or can refer to another suitable component configured to receive a clock signal. For instance, GPS navigation applications receive a clock signal that includes the date and time of day; the clock 222 can include a mechanism configured to access the clock signal from the GPS navigation application. Either by internally tracking or through accessing a clock signal or through any other suitable method, the clock 222 is configured to track the actual time 226.

The mobile device 202 also includes the navigation module 220. The navigation module 220 is configured to receive the actual time 226 from the clock 222 and to receive a determination of whether the operator is operating the vehicle 208 from the operation determination module 224.

Additionally, the navigation module 220 is configured to access a calendar event 212 from the local calendar application 210A and/or the remote calendar application 210B. The calendar event 212 is depicted only in the local calendar application 210A in FIG. 2A, however, it should be appreciated, with the benefit of the present disclosure, that the remote calendar application 210B can include the calendar event 212.

The calendar application 210 can be generated and supported by any calendar software, commercial or otherwise, that allows the operator to input one or more calendar events 212. Generally, the operator or someone affiliated with the operator inputs the calendar event 212 into the calendar application 210 using a computer or mobile device outside the vehicle in advance of the calendar event 212, such that the calendar event 212 is saved on a computer readable media in a standard format such as .ics iCalendar file format.

The calendar event 212 generally includes a reminder of a scheduled event that the operator intends on attending. The calendar event 212 includes an address 216, a scheduled time 214, and other data 218 (collectively referred to as "event information 212/216/218"). The scheduled time 214 refers to the time at which the scheduled event represented by calendar event 212 is to occur. Likewise, the address 216 is the location at which the scheduled event represented by the calendar event 212 is to occur. The other data 218 can include, but is not limited to, other attendees of the event, their contact information, etc.

The navigation module 220 is configured to access and extract the event information 212/216/218 associated with the calendar event 212. The navigation module 220 can access and extract the event information 212/216/218 internally within the mobile device 202 and/or via the communication network 206 from the remote calendar application 210B. For example, the local calendar application 210A can be stored on the mobile device 202. When the mobile device 202 is synchronized with the device 204, the navigation module 220 accesses and extracts the event information 212/216/218 from the local calendar application 210A. Additionally or alternatively, the remote calendar application 210B can be stored on another device (not shown), such as a cloud network, that is accessible via the communication network 206. When it is determined that the operator is operating the vehicle 208 and/or during operation of the predictive vehicle navigation system 200, the navigation module 220 accesses and extracts the event information 212/216/218 via the communication network 206 from the remote calendar application 210B.

Accordingly, the navigation module 220 includes various software and/or hardware developed to interface with multiple calendar applications. Thus, the operator can purchase, use, or change between multiple calendar applications and the navigation module 220 can still access and extract event information 212/216/218 therefrom.

In operation, when the operator is operating the vehicle 208, the navigation module 220 accesses and extracts the scheduled time 214 and/or the address 216 associated with the calendar event 212. Based at least partially on the scheduled time 214, the navigation module 220 generates a prediction as to a destination of the operator.

In some embodiments, when the actual time 226 is within a predetermined threshold of the scheduled time 214 and the operator is operating the vehicle 208, the navigation module 220 predicts that the address 216 is a destination of the operator. In some embodiments, the predetermined threshold is 10 minutes, 20 minutes, 30 minutes, or some other predetermined threshold. The navigation module 220 extracts the address 216 from the calendar event 212 and inputs the destination into the navigation application. In effect, the navigation module 220 assumes that if the operator is operating the vehicle 208 within a certain amount of time before the scheduled time 214 of a calendar event 212, the operator is likely traveling to the address 216.

In some embodiments, the predictive vehicle navigation system 200 can include additional functionality related to communicating one or more messages or notifications. In these and other embodiments, the navigation module 220 is configured to communicate messages or notifications under a variety of circumstance. For example, when the navigation module 220 determines that the operator is going to be late to an event represented in the calendar event 212, the navigation module 220 transmits a notification to other attendees of the event. The navigation module 220 calculates or approximates an arrival time at which the operator will reach the destination. The arrival time can be calculated from the address 216 and a current location, for instance. In addition, the navigation module 220 can interface with one or more vehicle components such as the vehicle components 112 of FIG. 1 to calculate the arrival time. From the vehicle components 112, the navigation module 220 can determine the speed of the vehicle 208 which may help to better approximate the arrival time.

When the arrival time is later than the scheduled time 214, the navigation module 220 accesses other data 218 from the calendar event 212 pertaining to one or more other attendees. When the other data 218 includes email addresses, phone numbers, etc. of the other attendees, the navigation module 220 extracts the other data 218 and generates a notification addressed to the other attendees. The notification communicates to the other attendees that the operator is late or going to be late. The mobile device 202 transmits the notification. For example, the notification can be an SMS text message 238 which can be transmitted via 3G, 4G, or LTE networks, for instance. Alternatively, the notification can be an email message 244 transmitted via the communication network 206. Additionally or alternatively, the notification may be notification on a social media website (not shown), an MMS message, etc.

Additionally or alternatively, after calculating the arrival time, the navigation module 220 displays the arrival time to the operator. For example, the navigation module 220 can communicate the arrival time to the vehicle 208 or the mobile device 202 on which the navigation application is loaded. On the vehicle 208, the arrival time may be displayed on a head unit 242 that displays the navigation application. Alternatively, on the mobile device 202 the arrival time may be internally communicated to a display 240 of the mobile device 202 on which the navigation application is displayed.

The predictive vehicle navigation system 200 also communicates a confirmation when the device 204 makes the prediction that the address 216 is the destination of the operator. The navigation module 220 displays the destination to the operator and/or transmits a confirmation message to the operator on an operator interface. For example, the destination can be displayed on the display 240 of the mobile device 202, the head unit 242 of the vehicle 208 and/or another suitable operator interface that allows the display of the destination and allows the operator to confirm the destination. The operator interface is configured to receive a confirmation from the operator that the destination was correctly predicted.

In some embodiments, only when the destination is confirmed is the address 216 input as the destination in the navigation application.

Additionally, the predictive vehicle navigation system 200 can communicate a reminder of the event represented in the calendar event 212. In some embodiments, the navigation module 220 calculates a travel time between a current or a common location, e.g., the residence or place of business of the operator, and the address 216. The navigation module 220 then generates a reminder notification that is communicated to the operator at a departure time. The departure time is at least the duration of the travel time before the scheduled time 214, thus giving the operator at least the travel time to reach the address 216.

Additionally, the predictive vehicle navigation system 200 can be configured to prompt the operator for permission to access the calendar application 210. The prompt can be communicated via the operator interface (e.g., the display 240 or the head unit 242 as discussed above) or can be included in an initialization between the operator, the mobile device 202, the device 204, or any combination thereof. In these and other embodiments, once permission is obtained from the operator, the navigation module 220 can thereafter access the calendar application 210.

The predictive vehicle navigation system 200 may also predict a destination based on information from related calendar events included in a repeating calendar event. FIG. 2B illustrates the predictive vehicle navigation system 200 configured to predict the destination based on the repeating calendar event and some additional functionality related to the repeating calendar event. In FIG. 2B, the calendar application 210 can be either a local calendar application, such as the local calendar application 210A, or a remote calendar application, such as the remote calendar application 210B of FIG. 2A. The calendar application 210 includes multiple calendar events 212A-212C (generally, calendar event 212 or calendar events 212). Each of the calendar events 212 is one calendar event 212 of a repeating calendar event. The repeating calendar event is an event that takes place at a recognizable interval and at a consistent address. In FIG. 2B, the consistent address is address 216. The recognizable interval is a repeating time interval between a first scheduled time 214A at which a first calendar event 212A occurs and a second scheduled time 214B at which a second calendar event 212B occurs. For example, the recognizable interval is "weekly" if the first scheduled time 214A, or each scheduled time, is separated from the second scheduled time 214B, or a subsequent scheduled time, by a week.

In embodiments in which repeating calendar events occur, the navigation module 220 is configured to recognize that the calendar event 212 is one event included in a repeating calendar event. For example, the navigation module 204 compares scheduled times 214A-214C and/or analyzes other data 218A-218C. The other data 218A-218C can include other attendees' information that may be indicative of a repeating calendar event. Additionally or alternatively, the other data 218A-218C can include a specific label or title indicating a repeating calendar event such as "weekly meeting."

Once the repeating calendar event is recognized, at a next recognizable interval, the navigation module 220 predicts that the destination is the consistent address. The navigation module 222 inputs the consistent address as the destination in a navigation application. As above, the navigation application 204 can also receive the determination that the operator is operating the vehicle 208 and/or the actual time 226 upon which the destination prediction can be further based.

Additionally, once the repeating calendar event is recognized, the device 204 can compare the information (e.g., 214A-214C, 216, and 218A-218C) included in each of calendar events 212 of a repeating calendar event. When the first calendar event 212A omits a portion of the information associated with the repeating calendar event, the device 204 copies the omitted information from another of the calendar events 212B or 212C and enters the copied information into the first calendar event 212A.

A benefit of the device 204 performing this operation is a reduction in information the operator inputs into the calendar application 210. Instead of entering all the other data 218A-218C for each calendar event 212A-212C, the operator can simply enter enough information for the navigation module 220 to recognize that the calendar event 212 is a repeating calendar event, thus saving time and unnecessary work.

Figure 3:
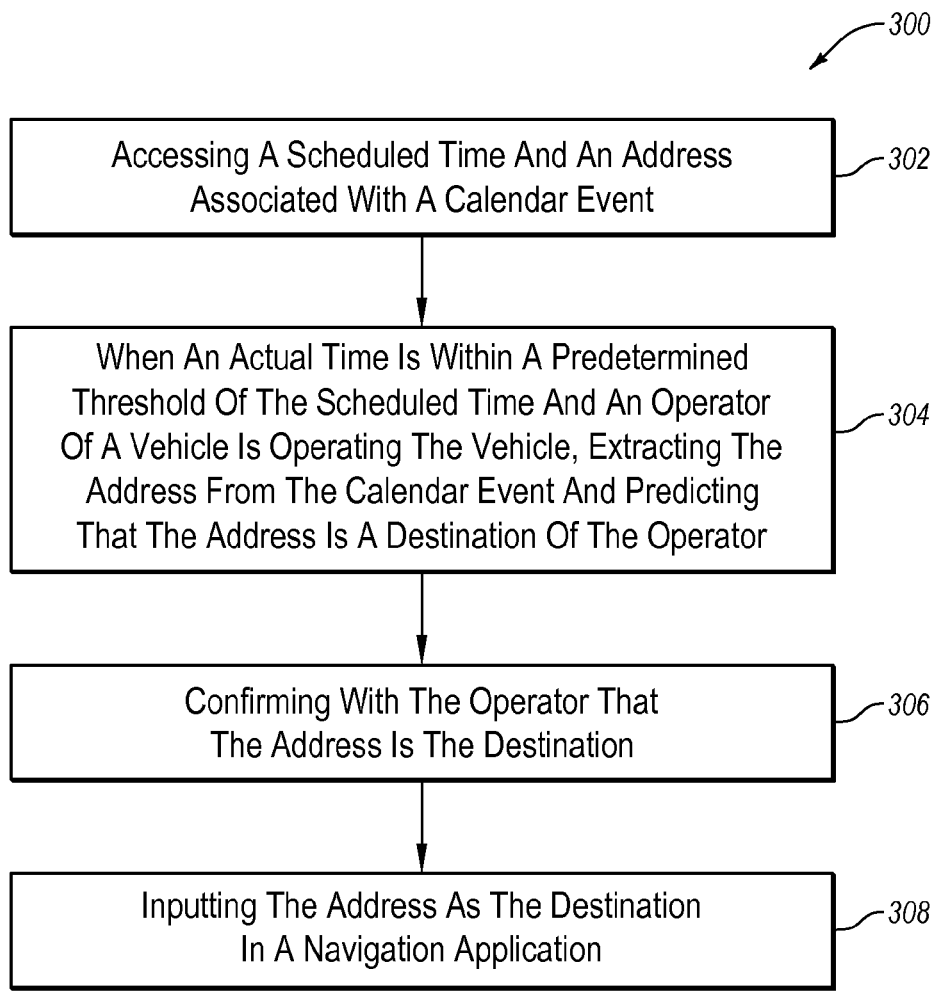
FIG. 3 is a flow chart of an example method of vehicle navigation, arranged in accordance with at least some embodiments described herein.

FIG. 3 is a flow chart of an example method 300 of vehicle navigation, arranged in accordance with at least some embodiments described herein. The method 300 begins at 302 by accessing a scheduled time and an address associated with a calendar event. The calendar event is generally stored in a local calendar application loaded onto a mobile device or a remote calendar application that is accessible via a wireless network connection.

At 304, when an actual time is within a predetermined threshold of the scheduled time and an operator of a vehicle is operating the vehicle, the address from the calendar event is extracted. The address is predicted to be a destination of the operator. The actual time can be accessed or tracked locally. Additionally, the predetermined threshold can be set by the operator or may have a default value. For example, the operator may prefer to be 15 minutes early to events. Accordingly, the threshold may be set to take the preference of the operator into consideration.

At 306, the destination is confirmed with the operator. A visual display or an audio notification can be communicated to the operator indicating that the address is the predicted destination. In some embodiments, the operator then audibly or by touching a button confirms that the address is indeed the desired destination.

At 308, the address is input as the destination in a navigation application. More particularly, in some embodiments, the address is communicated to the navigation application, which can be integrated into a vehicle or a mobile device of the operator, for instance.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments. For instances, the method 300 may further include approximating an arrival time at which the operator reaches the destination.

When the arrival time is later than the scheduled time, the method 300 may include accessing information from the calendar event pertaining to another attendee and notifying the other attendee that the operator is late or going to be late. The notification can be an email message, an SMS text message, an MMS message, etc.

Additionally, the calendar event can be one event of a repeating calendar event. The repeating calendar event includes a set or series of calendar events that takes place at a recognizable interval and at a consistent address. When the calendar event is one of a repeating calendar event, the method 300 may further include recognizing that the calendar event is one event in a repeating calendar event. For instance, the recognition can include recognizing the interval between events and/or the consistent address.

After recognizing the repeating calendar event, at a next recognizable interval, the method 300 may include predicting that the consistent address is the destination. As above, the consistent address may then be confirmed with the operator and then input as the destination in a navigation application.

Additionally, after recognizing the repeating calendar event, the method 300 may include comparing information included in each of the calendar events included in a repeating calendar event. When a first calendar event omits a portion of the information associated with the repeating calendar event, the omitted information can be copied from another of the calendar events and entered into the first calendar event.

Figure 4:
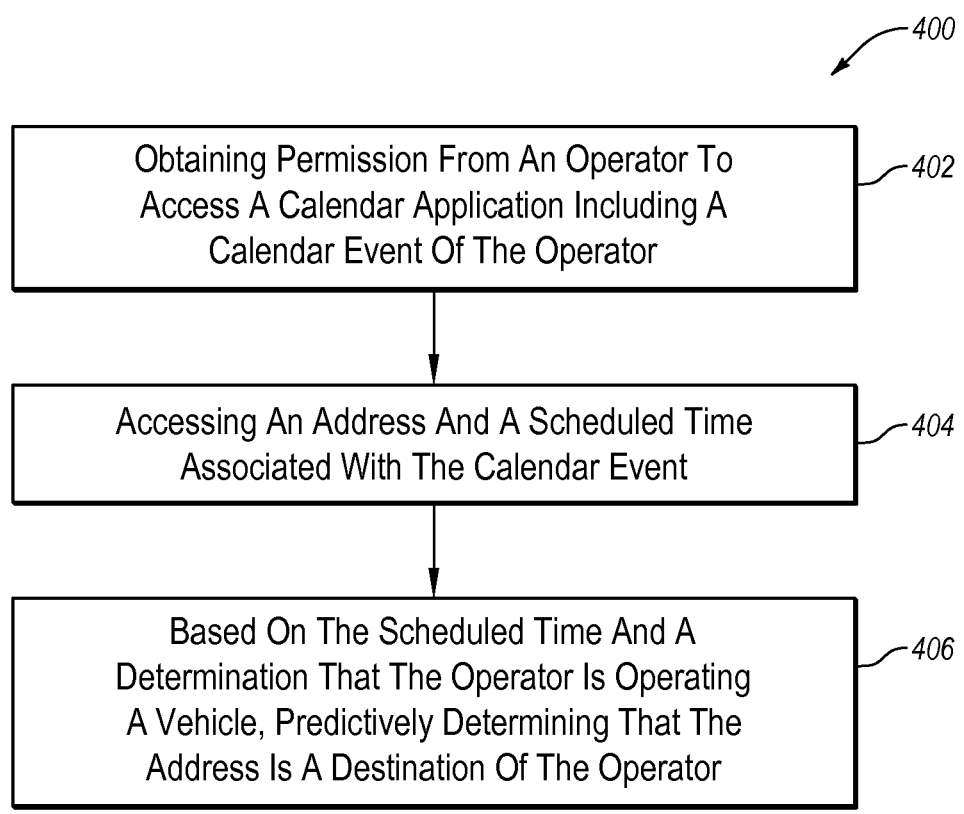
FIG. 4 is a flow chart of an example method of predictive vehicle navigation, arranged in accordance with at least some embodiments described herein.

FIG. 4 is a flow chart of an example method 400 of predictive vehicle navigation, arranged in accordance with at least some embodiments described herein. The method 400 begins at 402 by obtaining permission from an operator to access a calendar application that includes a calendar event of the operator. The calendar application may be a commercial calendar application, for instance. Permission to access the calendar application is granted by the operator in response to a specific inquiry or included in an initiation sequence conducted between a device and a mobile device.

At 404, an address and a scheduled time associated with the calendar event are accessed. For example, when the calendar application is a local calendar application loaded on the mobile device, the address and the scheduled time may be accessed through electrically communicating within the mobile device. Additionally or alternatively, when the calendar application is a remote calendar application, the calendar application is accessed via a wireless networking connection.

At 406, based on the scheduled time and a determination that the operator is operating a vehicle, the address is predictively determined to be a destination of the operator. In some embodiments, the method may also include receiving an actual time and comparing the actual time to the scheduled time to determine a time interval. The time interval is used to determine whether the address is the destination of the operator. For example, the address is predicted as the destination only when the time interval is less than a predetermined threshold. This reduces the possibility that the destination is inaccurately predicted.

Additionally, to reduce the possibility that the destination is inaccurately predicted, a confirmation message is transmitted to the operator, allowing the operator to view or receive notification that the address had been predicted to be the destination. When the operator confirms that the address is the destination, the method 400 includes inputting the address as the destination in a navigation application.

Additionally, using a current location and the address, a travel time may be calculated. The travel time may be calculated in advance of the scheduled time. Using the travel time, a departure time may be determined which is not later than the scheduled time minus the travel time. The operator is notified at or before the determined departure time that it is time to begin a trip to the destination.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include tangible computer-readable storage media including random-access memory (RAM), read-only memory (ROM), electrically erasable programmable read-only memory (EEPROM), compact disc read-only memory (CD-ROM) or other optical disk storage, magnetic disk storage or other magnetic storage devices, or any other storage medium which may be used to carry or store desired program code in the form of computer-executable instructions or data structures and which may be accessed by a general purpose or special purpose computer such as a system-on-chip (SOC). Combinations of the above may also be included within the scope of computer-readable media.

Computer-executable instructions include, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A predictive vehicle navigation system comprising:
a device including an adaptor configured to interface with a Controller Area Network (CAN) bus of a vehicle and to access vehicle data from the vehicle; and
a mobile device including:
an operation determination module configured to determine that an operator is operating the vehicle based on a subset of the data,
a clock configured to track actual date and time of day, and
a navigation module configured:
to obtain permission from an operator to access a calendar application including upcoming calendar events of the operator
to receive the actual time and a determination that the operator is operating the vehicle,
to access an address and a scheduled time associated with one of the upcoming calendar events, wherein the address includes a location at which the one of the upcoming calendar events is scheduled based on the scheduled time and the determination that the operator is operating a vehicle, to predictively determine that the address is a current destination of the operator to transmit a confirmation message to the operator; and in response to an operator confirmation being received from the operator, to input the address as the destination in a navigation application.

2. The predictive vehicle navigation system of claim 1, further comprising:

an operator interface configured to display the destination to the operator and to receive the operator confirmation from the operator that the destination is correctly predicted.

3. The predictive vehicle navigation system of claim 1, wherein the navigation module is configured to access the address and the scheduled time from at least one of a local calendar application on the mobile device or a remote calendar application via a wireless network connection.

4. The predictive vehicle navigation system of claim 1, wherein the navigation module is further configured to calculate an arrival time at which the operator will arrive at the destination and to display the arrival time to the operator.

5. The predictive vehicle navigation system of claim 4, wherein:

the navigation module is further configured to access attendee information included in the upcoming calendar event pertaining to one or more other attendees, and when the arrival time is after the scheduled time, the mobile device is configured to notify the one or more other attendees that the operator is late.

6. The predictive vehicle navigation system of claim 5, wherein the mobile device is configured to notify the one or more other attendees via an email message or a text message.

7. The predictive vehicle navigation system of claim 1, wherein the upcoming calendar event is included in a commercial calendar application, the navigation module being configured to interface with the commercial calendar application to access the address and the scheduled time.

8. The predictive vehicle navigation system of claim 1, wherein:

the upcoming calendar event comprises one event of a repeating calendar event that takes place at a recognizable interval and at a consistent address, and the navigation module is further configured to:

recognize that the calendar event is one of the repeating calendar event; and at a next recognizable interval, predict that the destination is the consistent address and input the consistent address as the destination in a navigation application.

9. A method of predictive vehicle navigation, the method comprising:

obtaining permission from an operator to access a calendar application including upcoming calendar events of the operator;

accessing an address and a scheduled time associated with one of the upcoming calendar events, the address including a location at which the one of the upcoming calendar events is scheduled:

based on the scheduled time and a determination that the operator is operating a vehicle, predictively determining that the address is a current destination of the operator;

transmitting a confirmation message to the operator; and in response to an operator confirmation being received from the operator, inputting the address as the destination in a navigation application.

10. The method of claim 9, further comprising:

approximating an arrival time at which the operator will reach the destination; and when the arrival time is later than the scheduled time, accessing information from the calendar event pertaining to another attendee of the calendar event and notifying the other attendee that the operator is late.

11. The method of claim 10, wherein notifying the other attendee comprises transmitting an email message or a text message to the other attendee.

12. The method of claim 9, wherein the upcoming calendar event is stored in a commercial calendar application.

13. The method of claim 9, wherein the upcoming calendar event is accessed internally within a mobile device or via a wireless communication network.

14. The method of claim 9, wherein the upcoming calendar event comprises one event of a repeating calendar event that takes place at a recognizable interval and at a consistent address, the method further comprising:

recognizing that the calendar event is one event of a repeating calendar event; and at a next recognizable interval, predicting that the destination is the consistent address and inputting the consistent address as the destination.

15. The method of claim 14, further comprising:

comparing information included in each of a plurality of calendar events of a repeating calendar event; and when a first calendar event omits a portion of the information associated with the repeating calendar event, copying the omitted information from another of the calendar events and entering the copied omitted information into the first calendar event.

16. The method of claim 9, further comprising:

receiving an actual time; and comparing the actual time to the scheduled time to determine a time interval, wherein the address is predictively determined as the destination only when the time interval is less than a predetermined threshold.

17. The method of claim 9, further comprising:

calculating a travel time; and notifying the operator at a departure time which is at least the travel time before the scheduled time.

18. A non-transitory computer-readable medium having encoded therein computer-executable instructions executable by one or more processors to perform operations comprising:

obtaining permission from an operator to access a calendar application including upcoming calendar events of the operator;

accessing an address and a scheduled time associated with one of the upcoming calendar events, the address including a location at which the one of the upcoming calendar events is scheduled;

based on the scheduled time and a determination that the operator is operating a vehicle, predictively determining that the address is a current destination of the operator;

transmitting a confirmation message to the operator; and in response to an operator confirmation is received from the operator, inputting the address as the destination in a navigation application.

19. The non-transitory computer-readable medium of claim 18, wherein the operations further comprise:

calculating a travel time;

notifying the operator at a departure time which is at least the travel time before the scheduled time;

approximating an arrival time at which the operator will reach the destination; and in response to the arrival time being later than the scheduled time, accessing information from the calendar event pertaining to another attendee of the calendar event and notifying the other attendee that the operator is late.

20. The non-transitory computer-readable medium of claim 18, wherein:
the upcoming calendar event is one event of a repeating calendar event that takes place at a recognizable interval and at a consistent address; and
the operations further comprise:
recognizing that the upcoming calendar event is one event of a repeating calendar event;
at a next recognizable interval, predicting that the destination is the consistent address and inputting the consistent address as the destination;
comparing information included in each of the repeating calendar events; and
in response to a first calendar event of the repeating calendar events omitting a portion of the information associated with the repeating calendar event, copying omitted information from another of the calendar events and entering the copied omitted information into the first calendar event.

* * * * *